(12) United States Patent
Pentakota et al.

(10) Patent No.: US 7,064,587 B2
(45) Date of Patent: Jun. 20, 2006

(54) OUTPUT BUFFER

(75) Inventors: Visvesvaraya Pentakota, Bangalore (IN); Nagarajan Viswanathan, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/775,022

(22) Filed: Feb. 9, 2004

(65) Prior Publication Data

US 2005/0116749 A1    Jun. 2, 2005

Related U.S. Application Data

(60) Provisional application No. 60/525,712, filed on Nov. 28, 2003.

(51) Int. Cl.
*H03K 3/00* (2006.01)

(52) U.S. Cl. ............... 327/108; 327/131; 327/132; 327/170

(58) Field of Classification Search ........ 327/108–112, 327/131, 132, 170, 384, 389–391
See application file for complete search history.

(56) References Cited

U.S. PATENT DOCUMENTS

| 5,124,597 A | * | 6/1992 | Stuebing et al. | ............ 327/261 |
| 5,283,515 A | * | 2/1994 | Jordan | ........................ 323/288 |
| 5,574,392 A | * | 11/1996 | Jordan | ........................ 327/131 |

* cited by examiner

*Primary Examiner*—Kenneth B. Wells
(74) *Attorney, Agent, or Firm*—W. James Brady, III; Frederick J. Telecky, Jr.

(57) ABSTRACT

A low-noise output buffer for a digital signal is based on an analog amplifier having bandwidth greater than the switching rate of the digital logic signal. A converter circuit converts the digital logic signal to a ramp signal provided as an input to the analog amplifier. The ramp signal has a slope determined by a bias current and an input capacitance of the analog amplifier. The bias current is generated by a bias circuit such that the bias current varies as the input capacitance of the analog amplifier varies due to variations in the manufacturing process. Therefore, the slope of the ramp signal remains substantially constant despite the variations in the manufacturing process. In particular, the slope of the ramp signal is not undesirably steep even when the buffer is made by a worst-case "strong" process.

5 Claims, 3 Drawing Sheets

OUTPUT BUFFER

CROSS REFERENCE TO RELATED APPLICATIONS

This application claims priority under 35 U.S.C. §119(e) of U.S. Provisional Patent Application No. 60/525,712 filed Nov. 28, 2003 and entitled "Low Noise Output Buffer", the disclosure of which is hereby incorporated by reference herein.

STATEMENT REGARDING FEDERALLY SPONSORED RESEARCH OR DEVELOPMENT

Not Applicable

BACKGROUND OF THE INVENTION

The invention pertains to the field of output buffers for semiconductor integrated circuits.

When a conventional output buffer of an integrated circuit drives an external capacitive load through a transmission line, signal reflections appearing on the transmission line can cause large voltage spikes, or "bounce", in the ground and/or supply circuits of the integrated circuit. This noise can couple into critical analog circuits through various paths, such as the substrate or the electrostatic discharge (ESD) ring, and degrade the performance of the IC. Traditional output buffers are designed to drive a maximum load capacitance under the weakest expected operating conditions, and therefore under stronger operating conditions may generate an excessive amount of ground and/or supply noise.

More recently, intelligent buffers have been designed to observe the output voltage at specified time instants in order to estimate the rise/fall time of the output signal, and then adjust their output strength to what is sufficient. But because of transmission line effects, the voltage observed at the output pin may not give a valid estimate of the rise time at the load end of the transmission line, and thus even such intelligent output buffers may be of only limited effectiveness in reducing ground and supply noise arising from signal reflections.

It would be desirable to reduce the level of ground and/or supply noise arising from transmission line effects in integrated circuits.

BRIEF SUMMARY OF THE INVENTION

In accordance with the present invention, a low-noise output buffer for a digital signal is disclosed that includes features that reduce the level of supply/ground noise arising from transmission line effects.

The output buffer includes an analog amplifier having a unity-gain bandwidth substantially larger than the switching rate of the digital logic signal. A converter circuit converts the digital logic signal to a ramp signal that is provided as an input to the analog amplifier. The ramp signal has a slope determined by a bias current and an input capacitance of the analog amplifier. The bias current is generated by a bias circuit in a manner ensuring that the bias current varies as the input capacitance of the analog amplifier varies due to variations in the manufacturing process of the buffer. Therefore, the slope of the ramp signal remains substantially constant despite the variations in the manufacturing process of the buffer. In particular, the slope of the ramp signal is not undesirably steep even when the buffer is made by a "strong" process, which is generally the worst case from the perspective of supply/ground noise.

Other aspects, features, and advantages of the present invention will be apparent from the Detailed Description that follows.

DETAILED DESCRIPTION OF THE INVENTION

Figure 1:
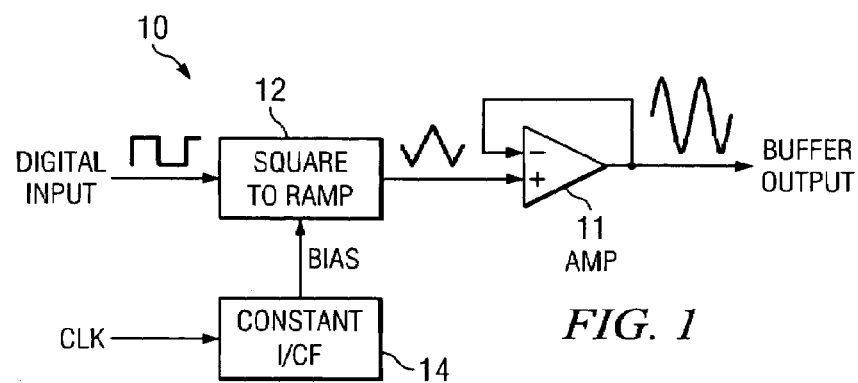
FIG. 1 is a block diagram of a low-noise output buffer in accordance with the present invention.

FIG. 1 shows the overall structure of a low noise output buffer 10 for a single data line. A high-bandwidth unity gain amplifier 11 drives the output load, which is presumed to be a capacitively loaded transmission line. The digital input to the output buffer 10 is provided to a square-to-ramp converter circuit 12, which converts the digital input to a slew-controlled ramp signal that is fed to the high bandwidth amplifier 11. The rise/fall time of the buffer output signal is controlled by the slope of the ramp generated. A bias circuit 14 provides a bias signal BIAS that is used by the converter circuit 12 to maintain constant slope on the ramp signal despite normal variations in the IC fabrication process, which provides for process-independent rise time with minimum ground/supply bounce.

Although FIG. 1 shows a single bias circuit 14 providing bias for a single buffer output, the bias signal BIAS may be shared among multiple buffer outputs if such is desirable. In one embodiment, 26 individual buffers appear on a single integrated circuit, and in such an embodiment it is desirable to utilize six separate bias circuits 14, four providing bias to 16 of the buffers and two providing bias to the remaining 10 buffers.

Figure 2:
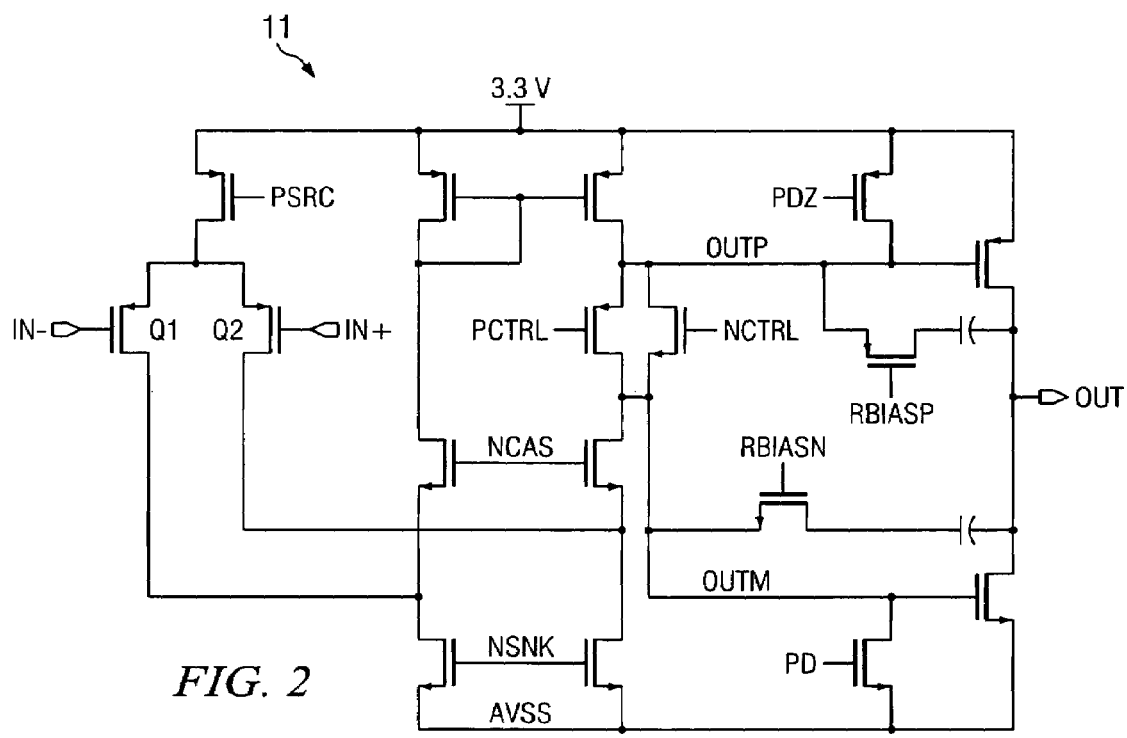
FIG. 2 is a schematic diagram of an analog amplifier in the output buffer of FIG. 1.

FIG. 2 shows the amplifier 11. The amplifier runs on a supply voltage of 3.3 volts, which can be generated from a 1.8 volt supply via a separate regulator (not shown). The amplifier 11 provides 1.8-volt low-voltage CMOS (LVC-MOS) output signals. The amplifier 11 has a 250 MHz bandwidth to support a 120 Mbps data rate. Also the amplifier has a common mode range of 0 to 1.8V.

The amplifier 11 is a two-stage, Miller-compensated amplifier, which provides the desired high bandwidth with a reasonable gain. Since the amplifier 11 is internally compensated, the bandwidth is independent of the load capacitance. The first stage includes PMOS transistors Q1 and Q2 in a p-input folded cascode configuration, which helps in achieving an input common mode voltage of 0 volts and to ensure that the output reaches the desired VOL. The second stage of the amplifier 11 has a differential-to-single-ended configuration. The second stage is a class AB push-pull amplifier capable of actively sourcing and sinking load currents.

Figure 3:
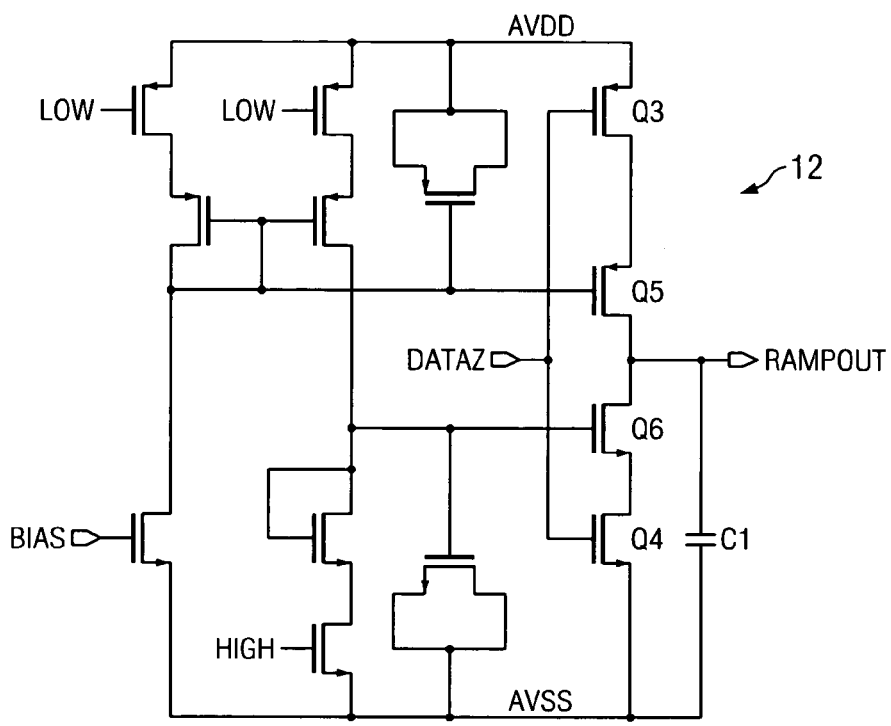
FIG. 3 is a schematic diagram of a ramp generator in the output buffer of FIG. 1.

FIG. 3 shows the ramp generator 12, which is operated from the 1.8 V supply AVDD. The ramp generator 12 converts the input data signal DATAZ to a process-independent ramp signal RAMPOUT, which is generated by switching on or off current sources that charge and discharge a capacitor C1. The switching action is achieved by transistors Q3 and Q4. Transistors Q5 and Q6 form the output transistors of the current sources. The currents supplied by the current sources, and therefore the respective slopes (rising and falling) of the ramp signal RAMPOUT, are controlled by the input signal BIAS from the bias circuit 14. As mentioned above, the signal BIAS is generated such that the slopes are substantially constant despite normal circuit variations caused by variations in the IC manufacturing process.

Figure 4:
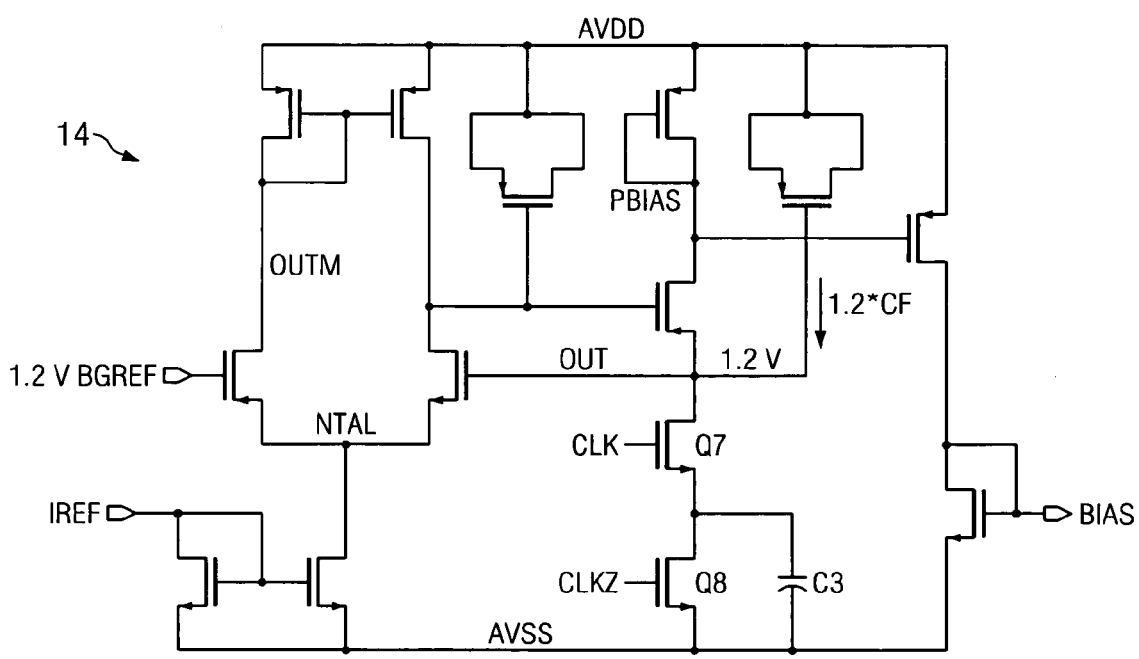
FIG. 4 is a schematic diagram of bias circuit in the output buffer of FIG. 1.

The bias circuit 14 is shown in FIG. 4. This circuit takes a reference voltage signal BGREF of 1.2V and forces it on an internal circuit node labeled OUT. The circuit utilizes a reference current IREF that is generated using a band-gap reference and resistor of known value (not shown). The node OUT has a switched capacitor resistor to ground, which is formed by transistors Q7 and Q8 and capacitor C0. The effective resistance to ground is 1/CF, where C is the capacitance of C0 and F is the switching frequency, which is established by the clock signal CLK and its inverse CLKZ. Hence, the average current through the resistor is 1.2*CF. This current is mirrored to generate the bias signal BIAS. Note that capacitor C0 mirrors the input capacitance of the main amplifier. Thus, as the input capacitance varies with process, the current available to generate the ramp signal RAMPOUT varies proportionally, so that the slope stays substantially constant. One additional advantage of this scheme is that the current generated is proportional to the frequency of operation. Thus the ramp is slowed down at lower frequencies of operation. This gives lower ground bounce at lower operating frequencies.

One of the major contributors to ground and supply bounce is the transmission line that needs to be driven by the output buffer 10. In addition to the normal CV/t current that is required to charge the load capacitor, the output buffer also needs to provide the extra current required to overcome reflections arising because of non-terminated transmission line. In the illustrated embodiment, the output buffer can drive a 50 ohm transmission line that has 400 picoseconds delay time and is terminated with a 4 pf capacitive load. In experimental observations, the current that is sourced/sunk by the output buffer is four times the current required without the transmission line. This extra current must pass through the supply/ground inductance, and therefore can result in a big increase in the supply/ground bounce. This noise can be reduced by using a series termination resistor. This resistor absorbs the reflections coming from the load-end of the transmission line. As a result, the output buffer does not see the reflections of the transmission line. This reduces the current the buffer has to source/sink, thus giving a lower supply/ground bounce.

Figure 5:
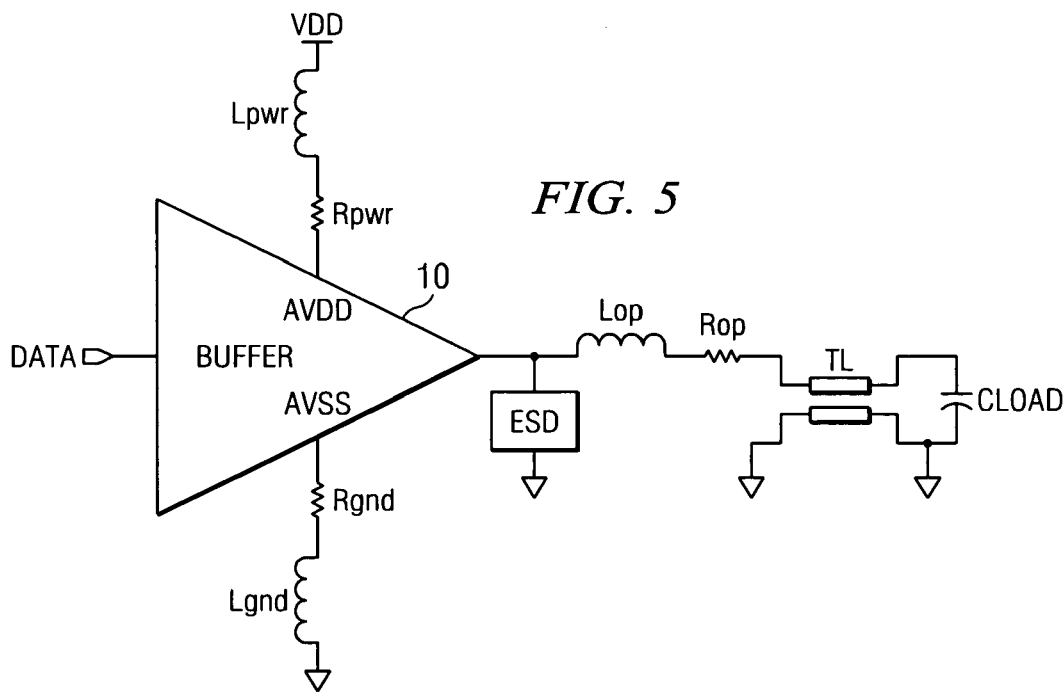
FIG. 5 is a schematic diagram of a test circuit including the output buffer of FIG. 1.

FIG. 5 shows an evaluation circuit used for simulations to evaluate the performance of the above-described output buffer 10 when driving a 400-picosecond transmission line TL and a 4-pf load capacitor load. The inductance and resistance of the buffer output pin are shown as Lop and Rop respectively. The output buffer is assumed to be part of an integrated circuit having 26 outputs all driven by similar output buffers 10. The IC is assumed to have 10 ground pins and 8 supply pins, each of which is assumed to have 8 nH of inductance. This includes the self-inductance and the sum of mutual inductances from other pins. Two consecutive ground or supply pins are treated as a single pin to account for the large mutual inductance between them. These various inductances are included in the inductors Lpwr and Lgnd.

Another aspect that is taken into consideration is the effective series resistance (ESR) of the supply capacitors. Each data line of the output buffer has a capacitance of 60 pf. Most of the switching current is provided by this capacitor and hence the ESR of this capacitor is very critical. The simulations assume a 2 ohm resistance in series with the 60 pf capacitance to account for the ESR. This capacitor also reduces the effective ground inductance to the parallel combination of ground and supply inductance. These resistances are included in the resistors Rpwr and Rgnd.

Figure 6:
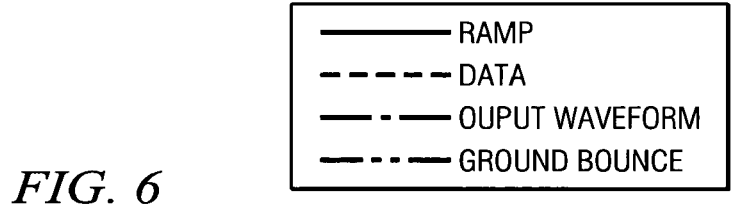
FIG. 6 is a plot of several signals in the test circuit of FIG. 5 during a circuit simulation thereof.

The worst-case noise occurs in the strong process corner with maximum load capacitance. As shown in FIG. 6, the worst-case ground bounce is less than 475 mV. This is the bounce observed when all the 26 output buffers are switching in the same direction. A consecutive "10" pattern was observed not to be the worst-case switching pattern. Instead, a few 0's followed by a single 1 and a few 1's followed by a single zero provided the worst switching noise. The buffer output with this pattern is worth observing in order to verify whether the output voltage reaches VOL and VOH with sufficient margins. Another aspect that needs to be observed is the effect of 25 buffers switching together in one direction on the 26th buffer switching in the other direction. The average current consumed by the IC when all 26 buffers are switching at 120 Mbps is 200 mA. The 10% to 90% rise time observed in simulation is 3 nS.

It will be apparent to those skilled in the art that modifications to and variations of the disclosed methods and apparatus are possible without departing from the inventive concepts disclosed herein, and therefore the invention should not be viewed as limited except to the full scope and spirit of the appended claims.

What is claimed is:

1. A low-noise buffer for a digital logic signal, comprising:
    an analog amplifier;
    a converter circuit operative to convert the digital logic signal to a ramp signal provided as an input to the analog amplifier, the ramp signal having a slope determined by a bias current and an input capacitance of the analog amplifier; and
    a bias circuit operative to generate the bias current in a manner ensuring that the bias current varies as the input capacitance of the analog amplifier varies, such that the slope of the ramp signal remains substantially constant.

2. A low-noise buffer according to claim 1, wherein the analog amplifier comprises:
    an input stage including a differential pair of PMOS transistors in cascode configuration; and
    a differential-to-single-ended, push-pull output stage.

3. A low-noise buffer according to claim 1, wherein the ramp circuit comprises a switched current source, the magnitude of the current supplied by the switched current source corresponding to the bias current.

4. A low-noise buffer for a digital logic signal, comprising:
    an analog amplifier;

a converter circuit operative to convert the digital logic signal to a ramp signal provided as an input to the analog amplifier, the ramp signal having a slope determined by a bias current and an input capacitance of the analog amplifier; and a bias circuit operative to generate the bias current in a manner ensuring that the bias current varies as the input capacitance of the analog amplifier varies, such that the slope of the ramp signal remains substantially constant, wherein the ramp circuit comprises:

a first switched current mirror operative to generate current of one polarity when the digital logic signal has a first logic value; and a second switched current mirror operative to generate current of the opposite polarity when the digital logic signal has a second logic value.

5. A low-noise buffer for a digital logic signal, comprising:

an analog amplifier;

a converter circuit operative to convert the digital logic signal to a ramp signal provided as an input to the analog amplifier, the ramp signal having a slope determined by a bias current and an input capacitance of the analog amplifier; and a bias circuit operative to generate the bias current in a manner ensuring that the bias current varies as the input capacitance of the analog amplifier varies, such that the slope of the ramp signal remains substantially constant, wherein the bias circuit comprises a switched-capacitor across which a predetermined reference voltage is placed to generate the bias current, the switched-capacitor including a capacitor having capacitance that varies as the input capacitance of the analog amplifier varies due to variations in the manufacturing process of the buffer.

* * * * *